United States Patent
Ito et al.

(10) Patent No.: US 10,850,717 B2
(45) Date of Patent: Dec. 1, 2020

(54) VEHICLE CONTROL DEVICE AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Yosuke Ito, Kariya (JP); Toru Takahashi, Kariya (JP); Masayasu Tanase, Toyota (JP); Wataru Ike, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 104 days.

(21) Appl. No.: 16/064,708

(22) PCT Filed: Dec. 21, 2016

(86) PCT No.: PCT/JP2016/088088
§ 371 (c)(1),
(2) Date: Jun. 21, 2018

(87) PCT Pub. No.: WO2017/110871
PCT Pub. Date: Jun. 29, 2017

(65) Prior Publication Data
US 2019/0001937 A1    Jan. 3, 2019

(30) Foreign Application Priority Data
Dec. 25, 2015    (JP) .................................. 2015-254468

(51) Int. Cl.
*G08G 1/16* (2006.01)
*B60R 21/00* (2006.01)
(Continued)

(52) U.S. Cl.
CPC ................ *B60T 7/22* (2013.01); *B60R 21/00* (2013.01); *B60T 7/12* (2013.01); *B60T 8/17* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 2004/0193351 A1* | 9/2004 | Takahashi | ................. G06F 7/00 701/70 |
| 2006/0155469 A1* | 7/2006 | Kawasaki | ............... G06F 17/10 701/301 |
| 2012/0078483 A1 | 3/2012 | Yajima et al. | |

FOREIGN PATENT DOCUMENTS

| CN | 1812901 A | 8/2006 |
|---|---|---|
| CN | 102815298 A | 12/2012 |

(Continued)

*Primary Examiner* — Redhwan K Mawari
*Assistant Examiner* — Melanie J Patrick
(74) *Attorney, Agent, or Firm* — Maschoff Brennan

(57) ABSTRACT

A driving assistance apparatus determines, based on an instantaneous indicator which is an instantaneous value of a parameter regarding steering of the own vehicle, whether a driver has started a collision avoidance operation for avoiding a collision between a target and the own vehicle. When it is determined that the collision avoidance operation has been started, a support start timing for starting driving assistance for avoiding the collision between the target and the own vehicle or reducing collision damage is set to be a timing later than when the collision avoidance operation has not been started. The support start timing during a collision avoidance time period which is a time period until a predetermined set time has elapsed after it is determined that the collision avoidance operation has been started is set based (Continued)

on a time-dependent indicator for steering indicated by the instantaneous indicator at timings during the collision avoidance time period.

10 Claims, 7 Drawing Sheets

(51) Int. Cl.
*B60T 7/22* (2006.01)
*B60T 7/12* (2006.01)
*B60T 8/17* (2006.01)

(56) References Cited

FOREIGN PATENT DOCUMENTS

| | | |
|---|---|---|
| JP | 2004-345401 A | 12/2004 |
| JP | 2011-063225 A | 3/2011 |
| JP | 2011-225143 A | 11/2011 |
| JP | 2012-066785 A | 4/2012 |
| JP | 2014-118048 A | 6/2014 |

* cited by examiner

VEHICLE CONTROL DEVICE AND VEHICLE CONTROL METHOD

CROSS-REFERENCE TO RELATED APPLICATION

This application is based on and claims the benefit of priority from earlier Japanese Patent Application No. 2015-254468 filed on Dec. 25, 2015, the disclosures of which is incorporated herein by reference.

TECHNICAL FIELD

The present disclosure relates to vehicle control technology for avoiding a collision between the own vehicle and an object or reducing damage due to the collision.

BACKGROUND ART

A pre-crash safety system has been developed as a safety system for avoiding a collision between a vehicle and an obstacle present around the vehicle or reducing damage due to the collision. When determining that there is a possibility of collision between the obstacle and the own vehicle, this system alerts the driver of the own vehicle or actuates a braking device to apply an automatic brake (for example, refer to Patent Literature (PTL) 1).

A vehicle control device disclosed in PTL 1 performs the following process. Specifically, a vehicle control device calculates time to collision (TTC) which is the time until the vehicle collides with an obstacle. Furthermore, based on the calculated time to collision, the vehicle control device determines the timing of starting secondary brake control for stopping the own vehicle in the state where the distance between the own vehicle and the obstacle is maintained at a predetermined distance. In addition, the vehicle control device determines the timing of starting a primary brake which is executed earlier than the timing of starting the secondary brake control. The vehicle control device actuates the primary brake and the secondary brake based on the determined timings.

CITATION LIST

Patent Literature

[PTL 1] JP 2014-118048 A

SUMMARY OF THE INVENTION

Technical Problem

From the perspective of safety assurance and accident prevention, it is preferable that an automatic brake for avoiding collision or reducing damage due to collision be actuated early on so that the speed is reduced sufficiently. On the other hand, if the timing of actuating the automatic brake is too early, a driver's collision avoidance operation and the automatic brake interfere with each other, which may cause annoyance or discomfort to the driver.

An object of the present disclosure is to provide a vehicle control device and a vehicle control method which achieve both sufficient speed reduction and prevention of unnecessary actuation.

Solution to Problem

In accordance with an aspect of the technique of the present disclosure, the following means is used.

A vehicle control device (10) according to the present disclosure includes: an object recognition unit (11) that recognizes an object present around the own vehicle; a collision determination unit (13) that determines a possibility of collision between the object recognized by the object recognition unit and the own vehicle; and a brake control unit (13, 14) that, if the collision determination unit determines that there is a possibility of a collision, performs a first brake control for applying a first braking force to the own vehicle and a second brake control for applying a second braking force greater than the first braking force to the own vehicle, as an automatic brake control for applying a braking force to the own vehicle. The brake control unit changes timings of starting the first brake control and the second brake control according to the lateral position of the object relative to the own vehicle.

The probability that collision with an object present ahead of the own vehicle in the direction of travel thereof can be avoided depends on the lateral position of the object relative to the own vehicle. Specifically, the probability of collision avoidance is lower (the risk of collision is higher) if the object is present at a position where the overlap with the own vehicle is larger. In contrast, assume that a great braking force is applied to the vehicle from early on in the case where there is a possibility of collision avoidance (the risk of collision is low). In such a case, the driver's collision avoidance operation and the brake control through driver assistance may interfere with each other. Thus, the driver assistance function through brake control may cause annoyance or discomfort to the driver. This means that this is an unnecessary actuation in the circumstances. In view of these points, with the configuration described above, the vehicle control device according to the present disclosure actuates each of the first brake control and the second brake control at the timing dependent on the probability of collision avoidance. In other words, the vehicle control device according to the present disclosure is configured to control the magnitude of a braking force to apply the braking force in stages according to the probability of collision avoidance. Thus, the vehicle control device according to the present disclosure achieves both sufficient speed reduction and prevention of unnecessary actuation.

DESCRIPTION OF THE EMBODIMENTS

Figure 1:
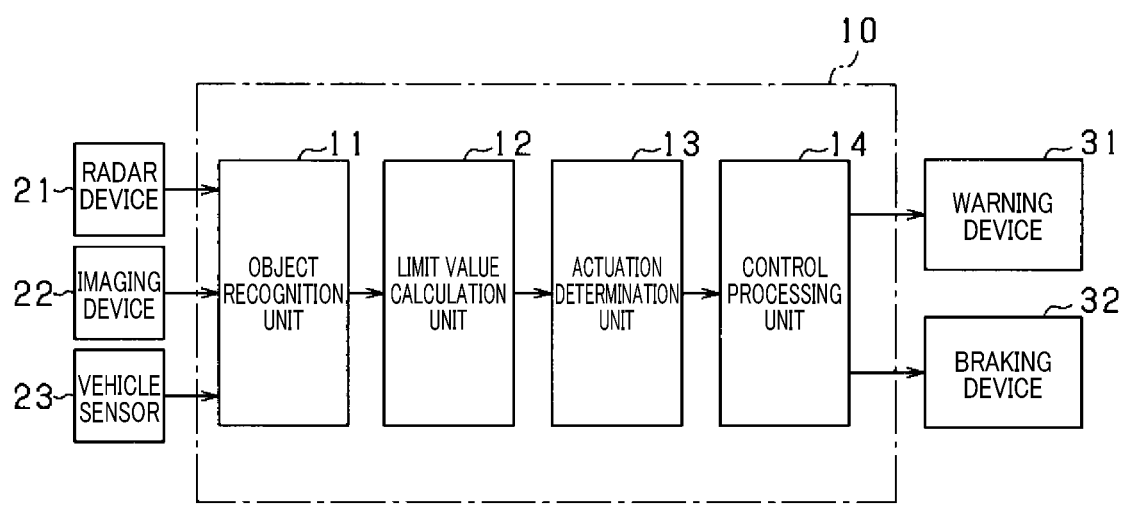
FIG. 1 is a block diagram schematically showing the configuration of a vehicle control device.

Embodiments of a vehicle control device which is an aspect of the technique of the present disclosure will be described with reference to the drawings. Note that the same or equivalent parts throughout the following embodiments share the same reference signs in the drawings, and the same description applies to the parts denoted by the same reference signs. The vehicle control device according to the present embodiment senses an object present around the own vehicle and actuates an in-car safety device to provide driver assistance. Thus, the vehicle control device according to the present embodiment functions as a pre-crash safety system that performs various processes for avoiding a collision between the own vehicle and an object or reducing damage due to the collision.

A vehicle control device 10 is a computer including a central processing unit (CPU), read-only memory (ROM), random-access memory (RAM), an input/output (I/O) device, and so on. The vehicle control device 10 implements each function shown in FIG. 1 by the CPU executing a program installed in the ROM. The vehicle control device 10 is connected to each of a radar device 21 and an imaging device 22 which are object detection sensors that sense an object present around the own vehicle. The vehicle control device 10 receives sensing information of an object from these sensors.

The radar device 21 is, for example, a known millimeter-wave radar that transmits a high-frequency signal in a millimeter-wave band as transmission waves. The radar device 21 is provided at a front end of the own vehicle and senses an object present inside a region within a predetermined sensing angle (a predetermined sensing region). The radar device 21 obtains the distance between the sensed object and the own vehicle, the relative speed of the object to the own vehicle, and the direction of the object, and transmits the obtained information about the object to the vehicle control device 10. The imaging device 22 is, for example, a charge-coupled device (CCD) camera, a complementary metal-oxide-semiconductor (CMOS) image sensor, or a near-infrared camera. The imaging device 22 is mounted at a predetermined height at the middle in the vehicle width direction of the vehicle, and captures an image of a region spread ahead of the vehicle over a predetermined angle range (a predetermined imaging region), from a downward view point. The imaging device 22 extracts a feature indicating the presence of the object from the captured image, and transmits the result of extracting the feature to the vehicle control device 10.

In addition, the vehicle includes, for example, various vehicle sensors 23 which detect a driving status of the own vehicle, such as an accelerator sensor, a brake sensor, a steering angle sensor, a yaw rate sensor, a vehicle speed sensor, and an acceleration sensor. The accelerator sensor detects an accelerator position which represents an operation amount on an accelerator pedal. The brake sensor detects an operation amount on a brake pedal. The steering angle sensor detects the steering angle of the steering wheel (steering wheel). The yaw rate sensor detects the angular speed (yaw rate) in a turning direction of the vehicle. The vehicle speed sensor detects the speed of the vehicle (hereinafter "own vehicle speed"). The acceleration sensor detects the acceleration of the vehicle.

As shown in FIG. 1, the vehicle control device 10 includes an object recognition unit 11, a limit value calculation unit 12, an actuation determination unit 13, and a control processing unit 14.

The object recognition unit 11 recognizes an object present around the own vehicle. The object recognition unit 11 obtains sensing information of an object from the radar device 21 and the imaging device 22. The object recognition unit 11 recognizes that the object is present at the position using positional information of the object obtained from the radar device 21 and positional information of the object obtained from the imaging device 22. Furthermore, the object recognition unit 11 associates, for each object, the relative position and the relative speed of the object to the own vehicle. Based on the associated relative position and relative speed, the object recognition unit 11 calculates, for each object, a lateral speed which is the relative speed in a direction orthogonal to the direction of travel of the own vehicle and a longitudinal speed which is the relative speed in the direction of travel of the own vehicle.

The object recognition unit 11 generates a fusion object by merging (fusion of) the object detected by the radar device 21 and the object detected by the imaging device 22. Specifically, the object recognition unit 11 identifies the longitudinal position of the fusion object (the relative position of the object to the radar device 21 in the longitudinal direction) based on the distance to the object, the relative speed of the object, etc., detected by the radar device 21. Furthermore, the object recognition unit 11 identifies the lateral position of the fusion object based on the lateral width of the object, the lateral position of the object, etc., detected by the imaging device 22 (the relative position of the object to the radar device 21 in the lateral direction). The object recognition unit 11 performs, using preset pattern data, pattern matching on the sensing information of the object obtained from the imaging device 22 (for example, performs a process of retrieving and sorting out data identical or similar to a specific pattern from a data group). As a result, the object recognition unit 11 identifies the type of the sensed object (for example, one of a vehicle, a pedestrian, a bicycle, and so on).

The limit value calculation unit 12 calculates time to collision. The limit value calculation unit 12 calculates the time to collision (TTC), which is the time until the own vehicle will collide with the object, by dividing the inter-vehicle distance (longitudinal position) between the own vehicle and the object by the relative speed. Note that the limit value calculation unit 12 may use the relative acceleration, instead of the relative speed, to calculate the time to collision, assuming that the own vehicle and the object come close to each other in accordance with linear motion with constant acceleration. Furthermore, the limit value calculation unit 12 calculates a lateral position limit value as a threshold for determining, based on the lateral position of the object, whether the safety device is to be actuated.

The safety device functions to avoid a collision between the own vehicle and an object or reduce damage due to the collision. In the present embodiment, a warning device 31 and a braking device 32 are provided as the safety device.

The warning device 31 is, for example, a speaker or a display installed in the interior of the vehicle. The warning device 31 outputs predetermined warning sound, a warning message, etc., based on an actuation command from the vehicle control device 10. Thus, the warning device 31 informs the driver that there is an imminent danger of collision (risk of collision) between the own vehicle and the object. The braking device 32 is a stopping device that puts a brake on the own vehicle. In the present embodiment, the vehicle control device 10 has the following braking functions in order to avoid a collision between the own vehicle and an object or reduce damage due to the collision. Specifically, the vehicle control device 10 has a brake assistance function of providing assistance by increasing the braking force applied through a braking operation of the driver or an automatic braking function of stopping the vehicle if the driver has not performed the braking operation. The braking device 32 executes brake control through these functions based on the actuation command from the vehicle control device 10. Note that the vehicle control device 10 may further include, as the safety device, a seat belt device which reels in a seat belt provided on each seat of the own vehicle and a steering device which provides automatic steering, for example.

The actuation determination unit 13 determines whether the lateral position of the object recognized by the object recognition unit 11 is within the range of the limit value and the time to collision is less than or equal to the threshold for the actuation timing. Thus, the actuation determination unit 13 determines whether the object is within the actuation region of the safety device. If the object is determined to be within the actuation region of the safety device according to the result (in the case of affirmative determination), the actuation command for actuating the safety device is transmitted to the control processing unit 14. The timings of actuating respective functions of the safety device have different preset values. The value of each actuation timing is stored, for example, in a predetermined storage region in a memory or the like (storage device) of the vehicle control device 10, and is obtained by being read from the storage region. In this manner, the actuation determination unit 13 functions as a "collision determination unit" which determines the possibility of collision between the object recognized by the object recognition unit 11 and the own vehicle.

The control processing unit 14 actuates the safety device (the warning device 31 or the braking device 32) based on the actuation command received from the actuation determination unit 13. Thus, in the present embodiment, the safety device is actuated based on the actuation command, and control of driver assistance, such as warning the driver by the warning device 31 and putting a brake by the braking device 32, is performed. For actuation of the braking device 32, the control processing unit 14 sets requested deceleration and requested jerk and actuates the braking device 32 based on the requested deceleration and the requested jerk that have been set. Note that the jerk, which indicates the rate of temporal change of deceleration, has a value obtained by differentiating deceleration with respect to time.

From the perspective of safety assurance and accident prevention, it is preferable that an automatic brake for avoiding collision or reducing damage due to collision be actuated early on. On the other hand, if the timing of actuating the automatic brake is too early, a driver's collision avoidance operation and the automatic brake (brake control through the driver assistance) interfere with each other. Therefore, the vehicle control device 10 according to the present embodiment sets the threshold for the actuation timing of actuating an automatic brake as follows. Specifically, the vehicle control device 10 sets the threshold for the actuation timing based on steering limit time to collision TTCc and braking limit time to collision TTCy. The steering limit time to collision TTCc is limit time to collision upon the occasion of steering avoidance limit for which, as a result of the driver noticing the possibility of collision between the own vehicle and an object and operating steering to the extent possible, the collision can be avoided. The braking limit time to collision TTCy is limit time to collision corresponding to a braking avoidance distance in which the collision can be avoided by actuation of a brake.

Figure 2A:
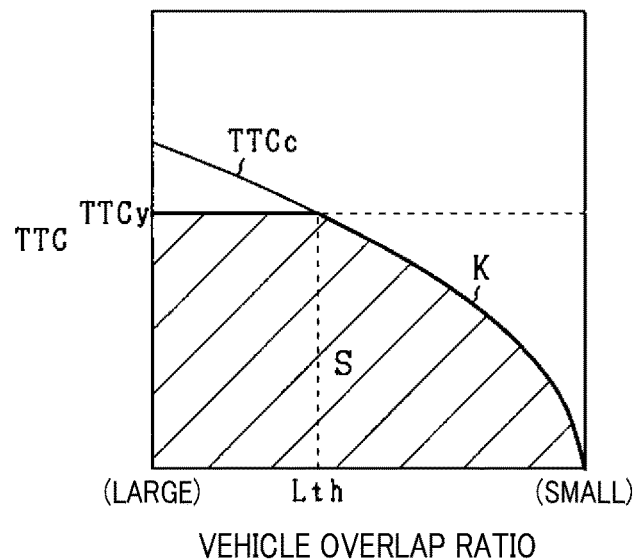
FIG. 2A shows the relationship between a vehicle lap ratio and limit time to collision.

The steering limit time to collision TTCc varies depending on a vehicle overlap ratio which is an index indicating an amount of overlap between the own vehicle and an other vehicle in the vehicle width direction. As shown in FIG. 2A, the value of the steering limit time to collision TTCc increases as the vehicle overlap ratio increases. The value of the braking limit time to collision TTCy is constant regardless of changes in the vehicle overlap ratio. In the present embodiment, an actuation timing threshold is set by combining the steering limit time to collision TTCc and the braking limit time to collision TTCy. As indicated by a thick line K in FIG. 2A, the steering limit time to collision TTCc is set in a region where the vehicle overlap ratio is less than a predetermined value Lth. In a region where the vehicle overlap ratio is greater than the predetermined value Lth, the braking limit time to collision TTCy (constant value) is set. In the vehicle control device 10 according to the present embodiment, when the time to collision TTC becomes less than or equal to the threshold for the actuation timing (when the time to collision TTC falls within the range of a region S in FIG. 2A), the automatic brake is actuated.

Figure 2B:
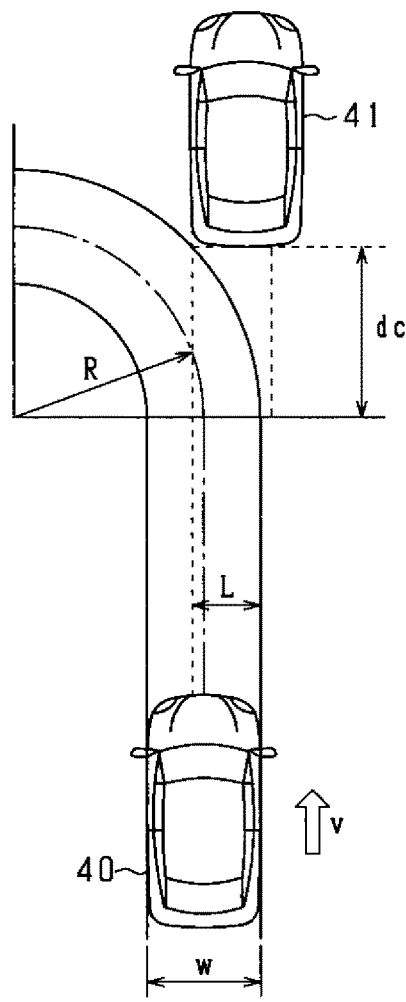
FIG. 2B shows the case where an other vehicle is present ahead of the own vehicle in the direction of travel thereof.

Note that FIG. 2B shows an example of the case where an other vehicle 41 is not moving ahead of the own vehicle 40 in the direction of travel thereof in the state where an other vehicle 41 overlaps the own vehicle 40 in the vehicle width direction (hereinafter "overlap state"), and the own vehicle 40 travels at a speed V with respect to an other vehicle 41. Where the relative distance between the own vehicle 40 and an other vehicle 41 upon the occasion of the steering avoidance limit is denoted as dc and the vehicle overlap ratio is denoted as L, the relative distance dc is expressed by Equation (1) below. As indicated in Equation (1) below, with an increase in the vehicle overlap ratio L, the relative distance dc increases, and the steering limit time to collision TTCc increases.

[Equation 1]

$$dc = \sqrt{\left(R + \frac{w}{2}\right)^2 + \left(R + \frac{w}{2} - L\right)^2} \quad (1)$$

$$\therefore dc = w\sqrt{2\left(1 + \frac{R}{w}\right)\frac{L}{w} - \left(\frac{L}{w}\right)^2}$$

Figure 3:
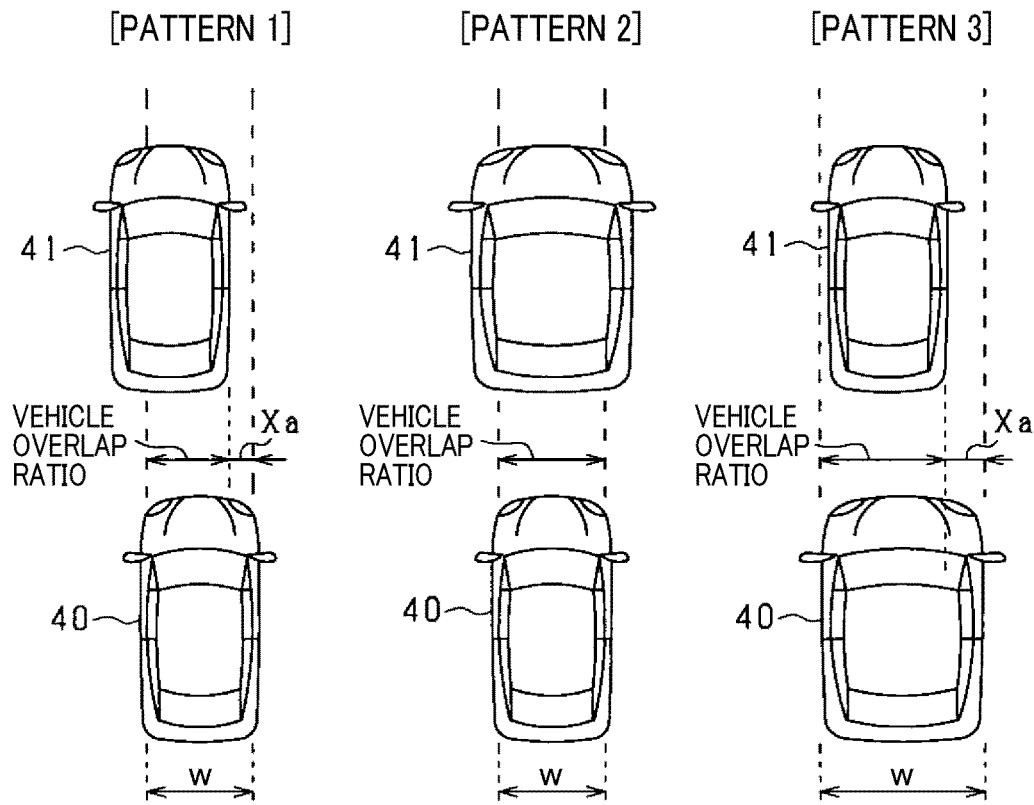
FIG. 3 shows patterns of an overlap state between an other vehicle and the own vehicle.

The overlap state of the own vehicle 40 and an other vehicle 41 is classified into three patterns according to the positional relationship and the vehicle width magnitude relationship between the own vehicle 40 and an other vehicle 41. Specifically, there are patterns 1, 2, and 3 such as those shown in FIG. 3. The pattern 1 is a state where an other vehicle 41 is offset from the own vehicle 40. The pattern 2 is a state where the vehicle width of an other vehicle 41 is greater than a vehicle width W of the own vehicle 40 and the vehicle width W of the own vehicle 40 is included in the vehicle width of an other vehicle 41 (a state where the entire own vehicle 40 is overlapping an other vehicle 41). The pattern 3 is a state where the vehicle width of an other vehicle 41 is less than the vehicle width W of the own vehicle 40 and the vehicle width of an other vehicle 41 is included in the vehicle width W of an other vehicle 40. Note that an other vehicle 41 includes a leading vehicle, an oncoming vehicle, and a stationary vehicle (stopped vehicle).

The vehicle overlap ratio L is calculated, for example, as follows. In the case of the pattern 1, the vehicle overlap ratio L is calculated by calculating an avoidance margin width Xa from a difference between the lateral position of the own vehicle 40 and the lateral position of an other vehicle 41 and subtracting the avoidance margin width Xa from the vehicle width W of the own vehicle 40. In the case of the pattern 2, the avoidance margin width Xa of the own vehicle 40 is 0. Thus, the vehicle overlap ratio L is 100%. In the case of the pattern 3, the avoidance margin width Xa is present on the left and right sides of the own vehicle 40 with respect to an other vehicle 41. At this time, the driver is expected to perform a collision avoidance operation in a direction in which the avoidance margin width Xa is large. Thus, in this case, the vehicle overlap ratio L is calculated by subtracting, from the vehicle width W of the own vehicle 40, the avoidance margin width Xa having a greater value among those on the left and right sides (in the present example, the avoidance margin width Xa on the right side of the own vehicle 40).

Here, in order to ensure safety assurance, even in the state where the vehicle overlap ratio L between an other vehicle 41 and the own vehicle 40 has a tow value (hereinafter "low overlap state"), the automatic brake is desirably actuated so that a collision between the own vehicle 40 and an other vehicle 41 (object) is reliably avoided. However, if the automatic brake is actuated when an other vehicle 41 and the own vehicle 40 are in the low overlap state, similar to the case where the vehicle overlap ratio L has a high value (hereinafter "high overlap state"), there is the following concern, for example. Specifically, when the driving results in the own vehicle 40 being located close behind an other vehicle 41, it is conceivable that the driver's collision avoidance operation and the automatic brake interfere with each other; unnecessary actuation of the automatic brake occurs.

Thus, the vehicle control device 10 according to the present embodiment has the following function as the automatic brake control for driver assistance. Specifically, the vehicle control device 10 has the function of performing low G brake control in which the own vehicle 40 is stopped with the requested deceleration that is relatively low and high G brake control in which the own vehicle 40 is stopped with the requested deceleration greater than that in the low G brake control. Furthermore, the vehicle control device 10 changes the timings of actuating the high G brake control and the low G brake control according to the vehicle overlap ratio L. The low G brake control corresponds to a "first brake control" in which a first braking force (braking force based on low requested deceleration) is applied to the own vehicle 40. The high G brake control corresponds to a "second brake control" in which a second braking force (braking force based on high requested deceleration) greater than the first braking force is applied to the own vehicle 40. The vehicle overlap ratio L corresponds to "the lateral position of an object relative to the own vehicle 40". The actuation determination unit 13 and the control processing unit 14 function as the "brake control units" which perform the first brake control and the second brake control.

Figure 4:
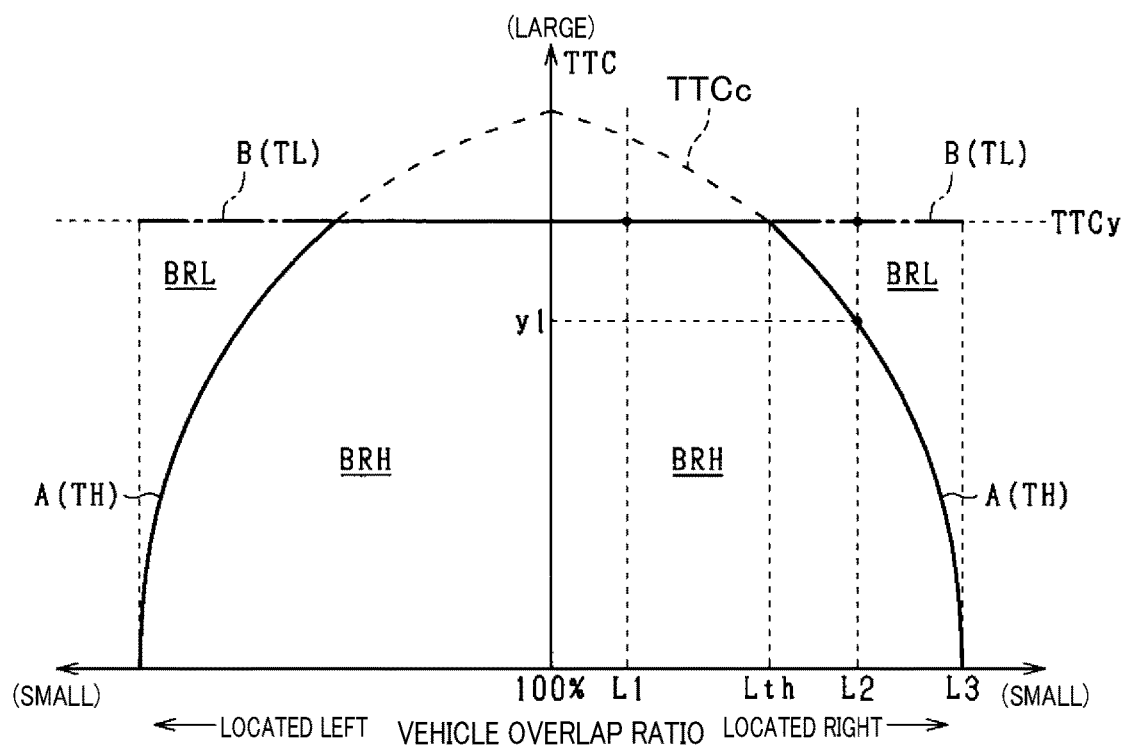
FIG. 4 shows a threshold for timings of actuating low G brake control and high G brake control.

FIG. 4 shows an example of the threshold for the timings of actuating the low G brake control and the high G brake control. The horizontal axis represents the vehicle overlap ratio L, and the vertical axis represents the time to collision TTC. In FIG. 4, a threshold TL for the timing of actuating the automatic brake is shown by a dashed line B, and a threshold TH is shown by a solid line A. Regarding the relationship between the vehicle overlap ratio L and the threshold for the actuation timing, an example where the own vehicle 40 is located right of an other vehicle 41 and an example where the own vehicle 40 is located left of an other vehicle 41 are shown.

In a region in the low overlap state where the vehicle overlap ratio L is between L3 and Lth (L3<Lth), a lower G actuation timing threshold TL, which is the threshold for the timing of actuating low G brake control BRL, and a high G actuation timing threshold TH, which is the threshold for the timing of actuating high G brake control BRH, are set. In the present embodiment, the low G actuation timing threshold TL is set to the braking limit time to collision TTCy shown by the dashed line B. The high G actuation timing threshold TH is set to the steering limit time to collision TTCc (TTCc<TTCy) shown by the solid line A. In contrast, in the region in the high overlap state where the vehicle overlap ratio L is greater than the predetermined value Lth, only the high G actuation timing threshold TH is set. The high G actuation timing threshold TH is set to the braking limit time to collision TTCy, which has a constant value.

For example, when the vehicle overlap ratio L is L2 (Lth>L2>L3) within a region in the low overlap state, the low G actuation timing threshold TL is set to the braking limit time to collision TTCy. The high G actuation timing threshold TH is set to y1 as the steering limit time to collision TTCc that corresponds to the vehicle overlap ratio L2. First, the vehicle control device 10 applies a small (weak) braking force (first braking force) to the own vehicle 40 through the low G brake control BRL at a timing when the time to collision TTC becomes lower than or equal to the low G actuation timing threshold TL. After the start of a braking operation through the low G brake control BRL, the vehicle control device 10 switches the low G brake control BRL to the high G brake control BRH at a timing when the time to collision TTC becomes lower than or equal to the high G actuation timing threshold TH. The vehicle control device 10 applies a braking force (second braking force) greater (stronger) than that applied through the low G brake control BRL to the own vehicle 40 through the high G brake control BRH. In other words, in a region in the low overlap state, the low G brake control BRL and the high G brake control BRH are performed in this order; the braking force is applied in stages.

In contrast, when the vehicle overlap ratio L is L1 (Lth<L1) within a region in the high overlap state, the high G actuation timing threshold TH is set to the braking limit time to collision TTCy (constant value). Meanwhile, the low G actuation timing threshold TL is not set. The vehicle control device 10 does not actuate the low G brake control BRL and applies a great (strong) braking force (second braking force) to the own vehicle 40 through the high G brake control BRH at a timing when the time to collision TTC becomes less than or equal to the high G actuation timing threshold TH. In other words, in a region in the high overlap state, the high G brake control BRH is performed from the beginning to actuate a strong brake. Note that in a region in the high overlap state where the vehicle overlap ratio L is greater than the predetermined value Lth, the low G actuation timing threshold TL may be set to 0 instead of the configuration in which the low G actuation timing threshold TL is not set. Thus, the low G brake control BRL may be set so as not to be actuated in a region in the high overlap state.

In the present embodiment, the weak brake is actuated before the strong brake in a region where the own vehicle 40 and an other vehicle 41 are in the low overlap state in the vehicle width direction and there is a risk of interference between the driver's collision avoidance operation and the brake control through the driver assistance. In contrast, in a region in the high overlap state where there is no risk of interference between the driver's collision avoidance operation and the brake control through the driver assistance, the strong brake is actuated at an early timing. Thus, the vehicle control device 10 according to the present embodiment can prevent unnecessary actuation of the driver assistance control and reduce the risk of collision.

Next, the procedure for automatic brake control which the vehicle control device 10 according to the present embodiment performs will be described with reference to the flowchart in FIG. 5. This process is performed according to a predetermined control cycle and is performed on each object present ahead of the own vehicle 40 in the direction of travel thereof.

Figure 5:
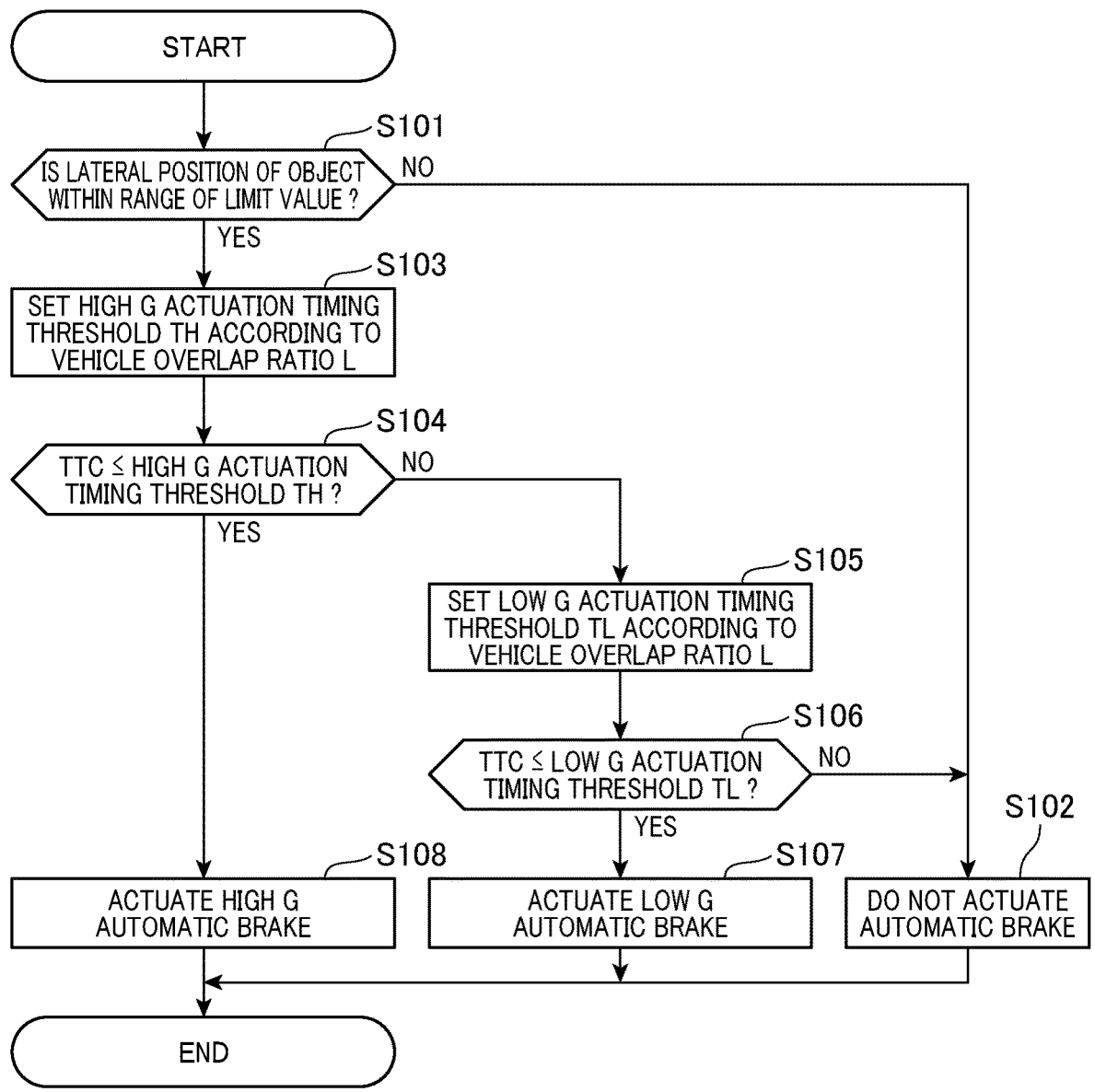
FIG. 5 is a flowchart showing the procedure for automatic brake control.

As shown in FIG. 5, the vehicle control device 10 determines whether the lateral position of the recognized object is within the range of the limit value (step S101). If the lateral position of the object is determined as not being within the range of the limit value (NO at step S101), the vehicle control device 10 does not actuate the automatic brake (step S102). On the other hand, if the lateral position of the object is determined as being within the range of the limit value (YES at step S101), the vehicle control device 10 calculates the vehicle overlap ratio L and sets the high G actuation timing threshold TH according to the calculated vehicle overlap ratio L (step S103). In the present embodiment, data in which the vehicle overlap ratio L and the threshold for the actuation timing are preset (for example, mapping data such as that shown in FIG. 4) is held in a predetermined storage region, such as memory, of the vehicle control device 10. Therefore, the vehicle control device 10 reads the high G actuation timing threshold TH corresponding to the current vehicle overlap ratio L from the predetermined storage region, such as the memory, in the process at step S103.

The vehicle control device 10 determines whether the time to collision TTC is less than or equal to the high G actuation timing threshold TH (step S104). If the time to collision TTC is determined as being less than or equal to the high G actuation timing threshold TH (YES at step S104), the vehicle control device 10 performs high G automatic brake actuation in which a great braking force (second braking force) is applied to the own vehicle 40 through the high G brake control BRH (step S108). On the other hand, if the time to collision TTC is greater than the high G actuation timing threshold TH (NO at step S104), the vehicle control device 10 proceeds to the process at step S105.

The vehicle control device 10 sets the low G actuation timing threshold TL according to the vehicle overlap ratio L (step S105). The vehicle control device 10 reads the low G actuation timing threshold TL corresponding to the current vehicle overlap ratio L from the predetermined storage region, such as the memory, in the process at step S105. The vehicle control device 10 determines whether the time to collision TTC is less than or equal to the low G actuation timing threshold TL (step S106). If the time to collision TTC is greater than the low G actuation timing threshold TL (NO at step S106), the vehicle control device 10 does not actuate the automatic brake. On the other hand, if collision avoidance time is determined as being less than or equal to the low G actuation timing threshold TL (YES at step S106), the vehicle control device 10 performs the low G automatic brake actuation in which a small braking force (first braking force) is applied to the own vehicle 40 through the low G brake control BRL (step S107). The vehicle control device 10 performs the processes at steps S102, S107, and S108, and ends the series of processes.

Figure 6A:
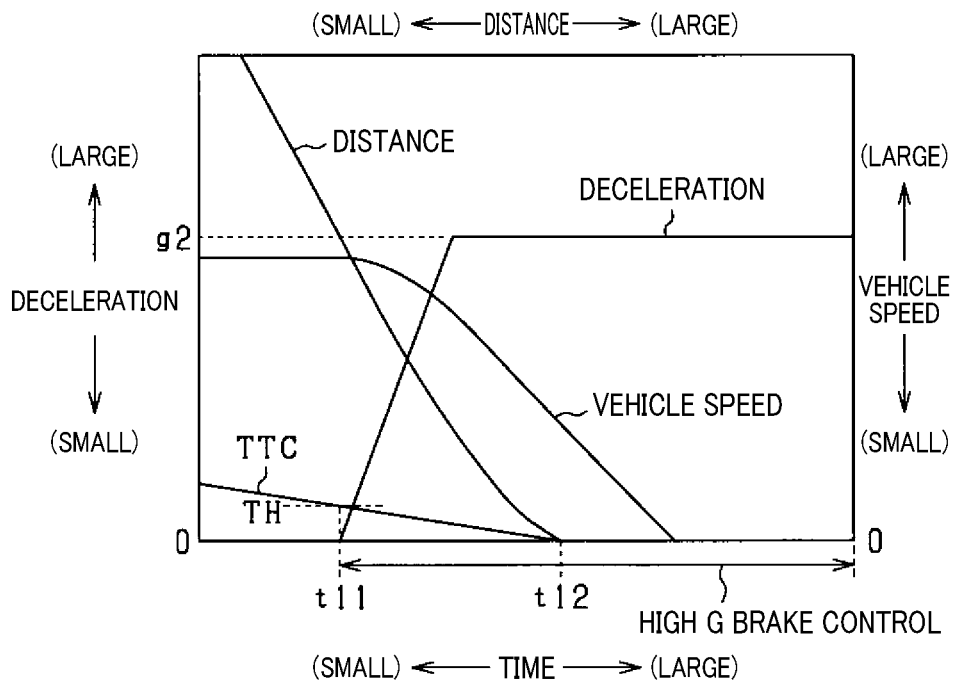
FIG. 6A is a timing diagram showing automatic brake control (in the case of performing only high G brake control).
Figure 6B:
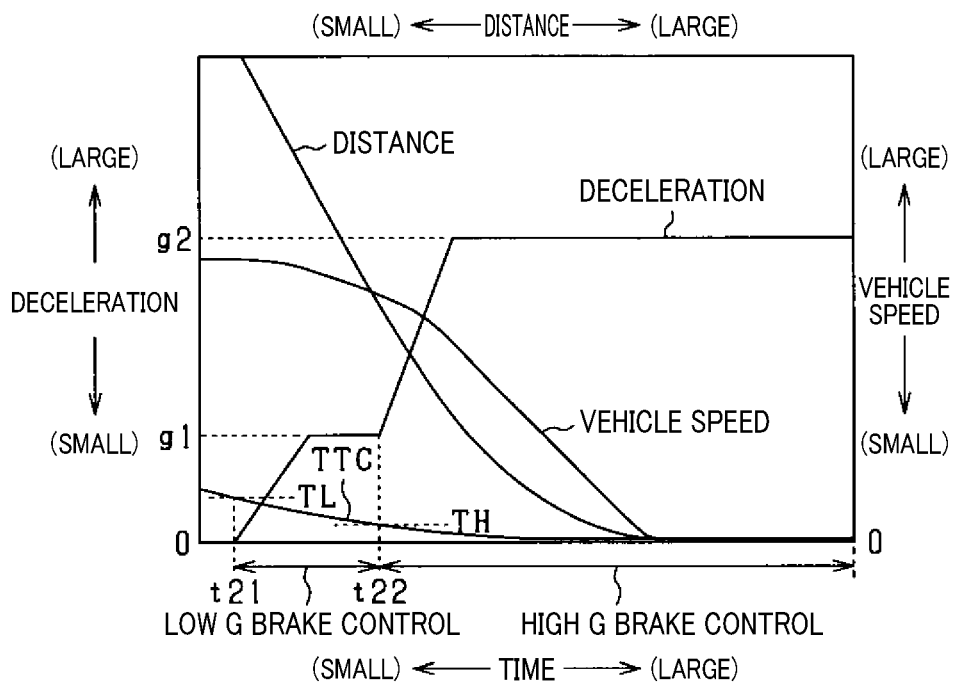
FIG. 6B is a timing diagram showing automatic brake control (in the case of performing low G brake control and high G brake control).

FIG. 6 is a tuning diagram showing the automatic brake control performed when the vehicle overlap ratio L is L2 in FIG. 4. FIG. 6A shows an example in the case of performing only the high G brake control BRH as the automatic brake control. FIG. 6B shows an example in the case of performing the low G brake control BRL and the high G brake control BRH at different timings. Note that the high G actuation timing threshold TH is set to the same value in FIGS. 6A and 6B.

As shown in FIG. 6A, in the case of performing only the high G brake control BRH, the braking device 32 is actuated as follows. Specifically, at a point in time t11 when the time to collision TTC becomes less than or equal to the high G actuation timing threshold TH, the braking device 32 is actuated with high deceleration g2 as the requested deceleration and high jerk j2 as requested jerk which is a requested value of the rate of temporal change in the deceleration. In contrast, as shown in FIG. 6B, in the case of performing the low G brake control BRL and the high G brake control BRH, the braking device 32 is actuated as follows. Specifically, at a point in time t21 when the time to collision TTC becomes less than or equal to the low G actuation timing threshold the braking device 32 is actuated first with low deceleration g1, which has a value lower (smaller) than the high deceleration g2, as the requested deceleration, and low jerk j1, which has a value lower (smaller) than the high jerk j2, as the requested jerk. Furthermore, at a point in time t22 when the time to collision TTC becomes less than or equal to the high G actuation timing threshold TH, the requested deceleration is switched from the low deceleration g1 to the high deceleration g2, the requested jerk is switched from the low jerk j1 to the high jerk j2, and thus the braking device 32 is actuated. Accordingly, in the case of performing the low G brake control BRL before the high G brake control BRH (FIG. 6B), the speed can be further reduced, compared to the case of performing only the high G brake control BRH (FIG. 6A).

The vehicle control device 10 according to the present embodiment described in detail above produces the following advantageous effects.

The vehicle control device 10 according to the present embodiment has the following function as the automatic brake control for driver assistance if it is determined that there is a possibility of collision between the object recognized by the object recognition unit 11 and the own vehicle 40. Specifically, the vehicle control device 10 has the function of performing the low G brake control BRL in which a relatively small braking force (brake force) is applied to the vehicle and the high G brake control BRH in which a braking force (brake force) greater than in the low G brake control BRL is applied to the vehicle. The vehicle control device 10 is configured to change the timings of actuating (timings of starting) the low G brake control BRL and the high G brake control BRH according to the vehicle overlap ratio L indicating the lateral position of an other vehicle 41 relative to the own vehicle 40. With this configuration, the vehicle control device 10 according to the present embodiment can actuate the low G brake control BRL and the high G brake control BRH at the timings dependent on the possibility of collision avoidance. Thus, the vehicle control device 10 can achieve both sufficient speed reduction and prevention of unnecessary actuation.

The vehicle control device 10 according to the present embodiment is configured to actuate the weak brake first, and then actuate the strong brake, in a region where an other vehicle 41 and the own vehicle 40 are in the low overlap state and there is a risk of interference between the driver's collision avoidance operation and the automatic brake (brake control through the driver assistance). Therefore, the vehicle control device 10 can reduce the feeling of discomfort that occurs in the driver due to interference between the collision avoidance operation and the automatic brake. In contrast, in a region where an other vehicle 41 and the own vehicle 40 are in the high overlap state and the driver's collision avoidance operation and the automatic brake do not interfere with each other, the high G brake control BRH is actuated at an early timing. Thus, the vehicle control device 10 reduces the risk of collision between the own vehicle 40 and the object.

In a region where the vehicle overlap ratio L is greater than the predetermined value Lth, the interference with the driver's collision avoidance operation does not occur even when the high G brake control BRH is performed from the very start of actuation of the automatic brake. Thus, the vehicle control device 10 according to the present embodiment sets the high G actuation timing threshold TH to the braking limit time to collision TTCy in a region where the vehicle overlap ratio L is greater than the predetermined value Lth. Furthermore, the vehicle control device 10 is configured not to perform the low G brake control BRL, but to perform only the high G brake control BRH. With this configuration, the vehicle control device 10 according to the present embodiment actuates the strong brake from the very start in a situation where the interference with the driver's collision avoidance operation does not occur. Thus, the vehicle control device 10 can achieve sufficient speed reduction.

The vehicle control device 10 according to the present embodiment is configured to change the timings of actuating (tunings of starting) the low G brake control BRL and the high G brake control BRH according to the vehicle overlap ratio L. The probability that the collision between the own vehicle 40 and an other vehicle 41 can be avoided depends on the vehicle overlap ratio L. The greater the vehicle overlap ratio L is, the lower the probability of collision avoidance is; the lesser the vehicle overlap ratio L is, the higher the probability of collision avoidance is. Thus, with this configuration, the vehicle control device 10 according to the present embodiment can actuate the low G brake control BRL and the high G brake control BRH at the timings dependent on the probability of collision avoidance.

The vehicle control device 10 according to the present embodiment is configured to actuate the automatic brake with the requested deceleration and the requested jerk that are set lower in the low G brake control BRL than in the high G brake control BRH. In this case, in a region where the own vehicle 40 is in the low overlap state relative to an other vehicle 41 and there is a risk of interference between the driver's collision avoidance operation and the automatic brake, the brake is actuated as gradually as possible. Therefore, the vehicle control device 10 can further reduce the feeling of discomfort that occurs in the driver due to interference between the collision avoidance operation and the automatic brake.

[Other Embodiments]

The technique of the present disclosure is not limited to the embodiment described above and may be implemented, for example, as follows.

Figure 7:
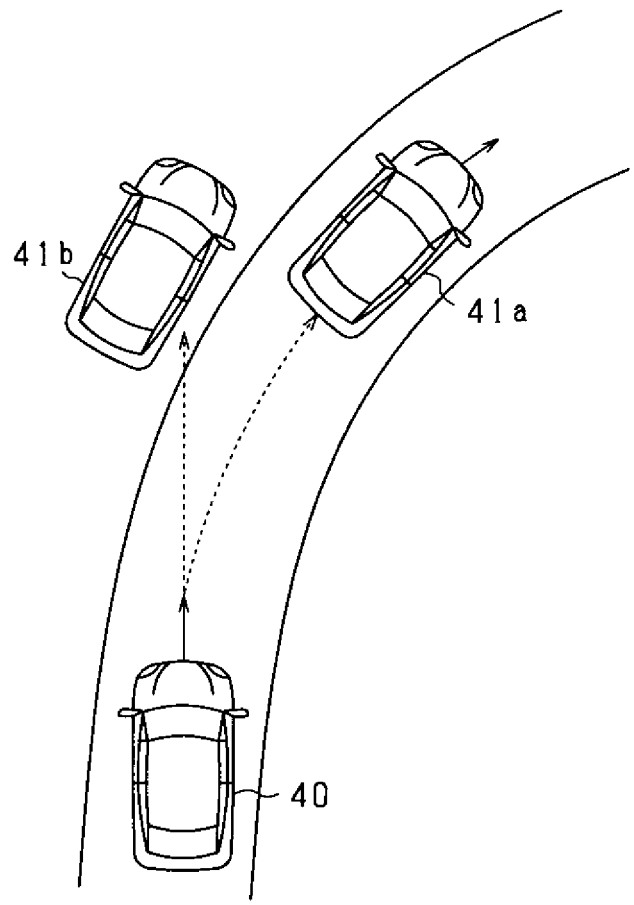
FIG. 7 shows a state of driving in a path approaching a curve.

The vehicle control device 10 may be configured to perform the following process when the object recognized by the object recognition unit 11 is an other vehicle 41. Specifically, the vehicle control device 10 includes an other vehicle determination unit which determines whether an other vehicle 41 is present in the same lane as the own vehicle 40. If an other vehicle 41 is determined as being present in the same lane as the own vehicle 40, the low G brake control BRL and the high G brake control BRH are performed according to the vehicle overlap ratio L. On the other hand, if an other vehicle 41 is determined as not being in the same lane as the own vehicle 40, the execution of the low G brake control BRL is prohibited. For example, in a situation where the own vehicle 40 travels on the entry to a curved path, as shown in FIG. 7, the direction of travel of the own vehicle 40 and the direction of travel of a vehicle 41*a* traveling in the same lane as the own vehicle 40 are different. In such a case, although the object to be determined as a collision avoidance target is the vehicle 41*a* present in the same lane as the own vehicle 40, a vehicle 41*b* present in an adjacent outer lane of the curve is determined as the collision avoidance target. Such erroneous determination may cause unnecessary actuation of the automatic brake (brake control through the driver assistance). Therefore, the automatic brake control that is actuated in a region in the low overlap state is limited to the high G brake control BRH. Thus, unnecessary actuation of the automatic brake can be prevented.

Figure 8:
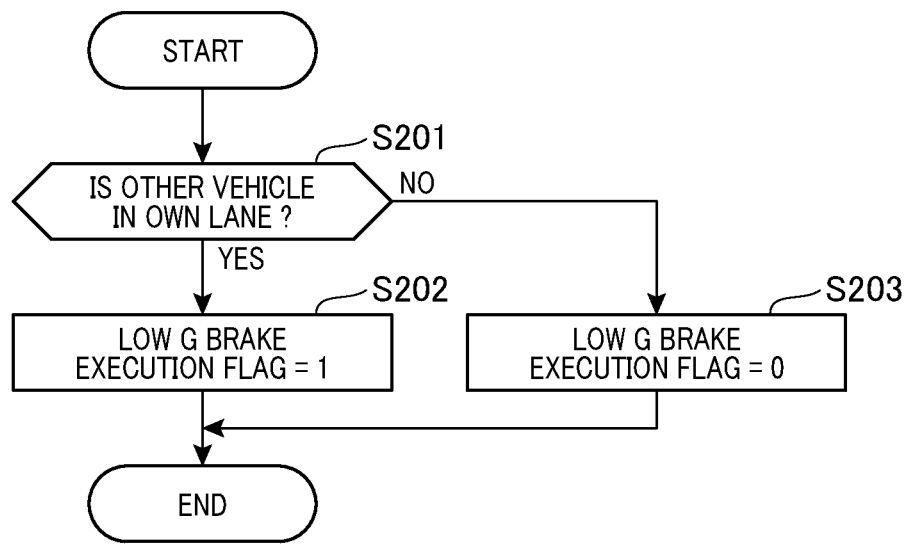
FIG. 8 is a flowchart showing the procedure for automatic brake control according to an other embodiment.

FIG. 8 is a flowchart showing an example of the procedure for the automatic brake control performed in consideration of whether an other vehicle 41 is present in the same lane as the own vehicle 40 (hereinafter "in the own lane"). This process is performed according to a predetermined control cycle and is performed on each object present ahead of the own vehicle 40 in the direction of travel thereof. As shown in FIG. 8, the vehicle control device 10 determines whether the recognized object is an other vehicle 41 and an other vehicle 41 is present in the own lane (step S201). In the process at step S201, the vehicle control device 10 calculates a white-line overlap ratio indicating an amount of overlap between an other vehicle 41 and a white line defining the own lane, and makes the determination according to whether the calculated white-line overlap ratio is greater than or equal to a determination value (threshold). If an other vehicle 41 is determined as being present in the own lane (YES at step S201), the vehicle control device 10 sets a low G brake execution flag to 1 (step S202). The low G brake execution flag indicates permission/prohibition of the low G brake control BRL. When the execution of the low G brake control BRL is permitted, the low G brake execution flag is set to 1; when the execution of the low G brake control BRL is prohibited, the low G brake execution flag is set to 0. If an other vehicle 41 is determined as not being present in the own lane (NO at Step S201), the vehicle control device 10 sets the low G brake execution flag to 0 (step S203). In the process in FIG. 5 which is described in the above embodiment, the process at steps S105 to S107 is performed on the condition that the low G brake execution flag set in FIG. 8 is 1.

The vehicle control device 10 may be configured to include an operation detection unit which detects a start of the driver's collision avoidance operation for avoiding collision between the object and the own vehicle 40 by comparison between information about steering of the own vehicle 40 and a steering determination value (threshold). If the operation detection unit detects a start of the collision avoidance operation, the vehicle control device 10 prevents actuation of the automatic brake. Furthermore, with the configuration including the operation detection unit, the vehicle control device 10 may be configured to set the steering determination value such that a start of the collision avoidance operation is determined in the low G brake control BRL more easily than in the high G brake control BRH. When the driver's collision avoidance operation is started, it can be determined that the driver has an intention to avoid the collision. The driver's operation at this time varies depending on the vehicle overlap ratio L; the lesser the vehicle overlap ratio L is, the smaller the steering operation for avoiding the collision is. Thus, with the configuration described above, the vehicle control device 10 according to the present embodiment can favorably prevent unnecessary actuation of the driver assistance control in the case of performing the low G brake control BRL.

Figure 9:
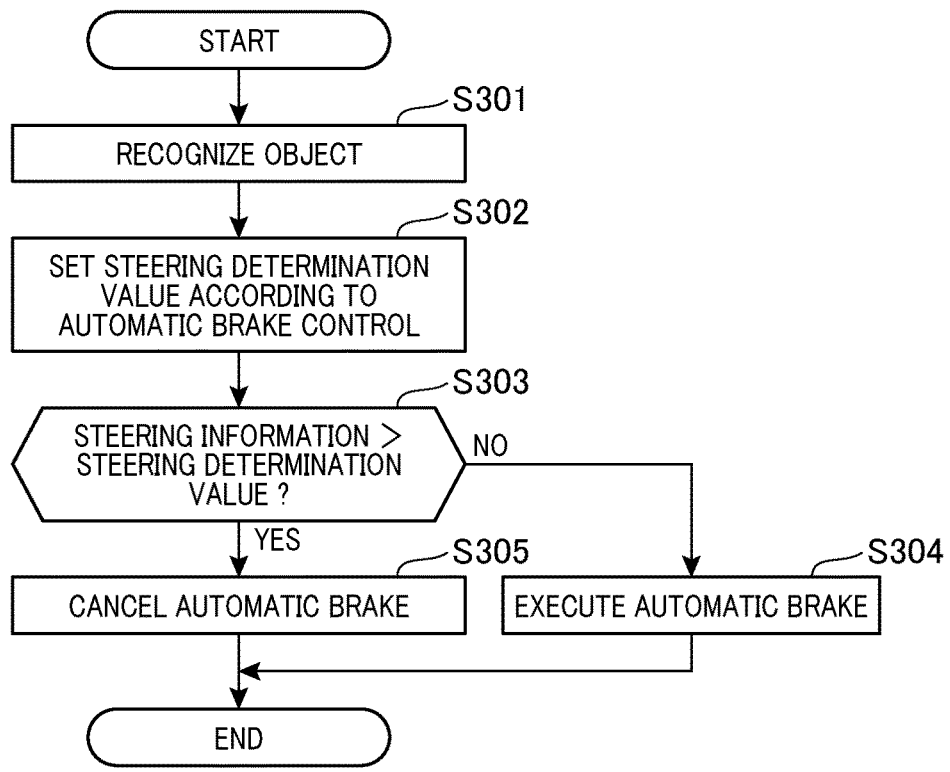
FIG. 9 is a flowchart showing the procedure for autocratic brake control according to an other embodiment.

FIG. 9 is a flowchart showing an example of the procedure for automatic brake control performed when the steering determination value is set variable. This process is performed according to a predetermined control cycle and is performed on each object present ahead of the own vehicle 40 in the direction of travel thereof. Note that the example of the procedure shown in FIG. 9 describes the case where the driver's collision avoidance operation is determined based on a steering angle speed.

As shown in FIG. 9, the vehicle control device 10 recognizes an object using the sensing information of the object from the radar device 21 and the sensing information of the object from the imaging device 22 (step S301). The vehicle control device 10 sets the steering determination value according to automatic brake control (step S302). Specifically, the steering determination value for the high G brake control is set to θ1 (for example, 150 to 180 degrees). The steering determination value for the low G brake control BRL is set to θ2 (for example, 20 to 40 degrees). The vehicle control device 10 compares the steering determination value and steering information (steering angle speed) which is information about steering, and determines whether the steering angle speed is greater than the steering determination value (step S303). If the steering angle speed is determined as being less than or equal to the steering determination value (NO at step S303), the vehicle control device 10 actuates the automatic brake at a timing when the time to collision TTC becomes less than or equal to the threshold for the actuation timing (step S304). On the other hand, if the steering angle speed is determined as being greater than the steering determination value (YES at step S303), the vehicle control device 10 cancels the actuation of the automatic brake (step S305). As just mentioned, the steering determination value is set low in the low G brake control BRL. Therefore, the vehicle control device 10 can prevent unnecessary actuation of the driver assistance control because the automatic brake is easily canceled by a driver's steering operation. Note that as the steering information, the steering angle speed may be replaced by the steering angle detected by the steering angle sensor, for example. Furthermore, as a configuration that prevents actuation of the automatic brake if the start of the collision avoidance operation is determined, a configuration that corrects the threshold such that the actuation timing is delayed by a predetermined length of time may be used instead of a configuration that cancels the actuation of the automatic brake.

In the above embodiment, the automatic brake is configured to be actuated with the requested deceleration and the requested jerk that are set lower in the low G brake control BRL than in the high G brake control BRH, but this is not limiting. As an other embodiment, a configuration that sets the requested jerk in each of the low G brake control BRL and the high G brake control BRH to the same value and sets the requested deceleration low in the low G brake control BRL may be used.

The above embodiment uses the configuration that sets the thresholds for the timings of actuating the low G brake control BRL and the high G brake control BRH using the vehicle overlap ratio L, but this is not limiting. As an other embodiment, a configuration that sets the thresholds for the timings of actuating the low G brake control BRL and the high G brake control BRH using the lateral position of the object relative to the own vehicle 40 may be used. This configuration is particularly effective when the object is a pedestrian, a bicycle, or the like. Specifically, instead of the data that defines the relationship between the vehicle overlap ratio L and the threshold for the actuation timing (the map data in FIG. 4), data that defines the relationship between the lateral position of the object relative to the own vehicle 40 and the threshold for the actuation timing is stored. In this configuration, with reference to the data, the threshold for the actuation timing that is associated with the lateral position of the object is read. In this way, in this configuration, the low G actuation timing threshold TL and the high G actuation timing threshold TH are set such that the low G brake control BRL and the high G brake control BRH are actuated in this order in a region where the lateral position of the object is farther away from the own vehicle 40. On the other hand, in a region where the lateral position of the object is closer to the own vehicle 40, the high G actuation tuning threshold TH is set such that only the high G brake control BRH is actuated.

The relationship between the vehicle overlap ratio L and the thresholds for the timings of actuating the low G brake control BRL and the high G brake control BRH is not limited to the data shown in FIG. 4 in the above embodiment. For example, the low G actuation timing threshold TL is set to a constant value of the braking limit time to collision TTCy in FIG. 4, but the low G actuation timing threshold TL may be set variable according to the vehicle overlap ratio L. Specifically, in consideration of the timing at which the driver performs the collision avoidance operation for an obstacle, the low G actuation tuning threshold TL is set to a smaller value (shorter time) as the vehicle overlap ratio L decreases. Furthermore, the curved portion of the high G actuation timing threshold TH shown in FIG. 4 may be converted into mapping data so that implementation load is reduced.

Figure 10:
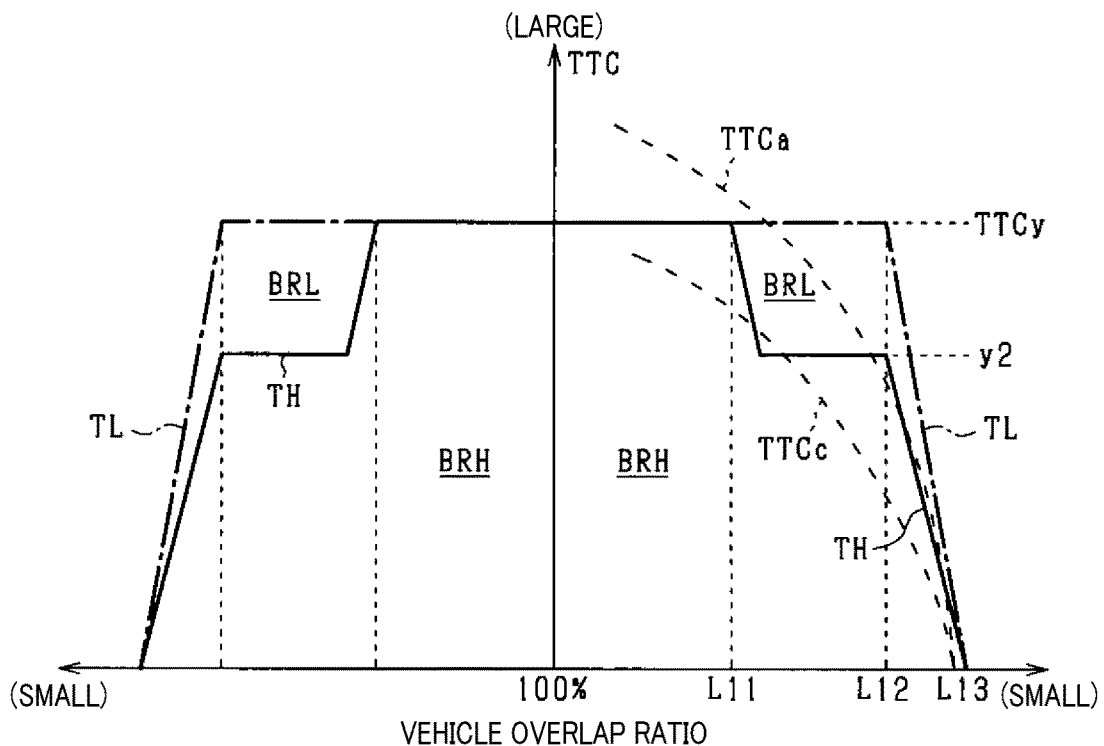
FIG. 10 shows a threshold for an actuation timing according to an other embodiment.

FIG. 10 shows an example of the thresholds for the timings of actuating the low G brake control BRL and the high G brake control BRH, which is different from that in FIG. 4. In a region in the low overlap state where the vehicle overlap ratio L is between L13 and L12 (L13<L12), the low G actuation timing threshold TL and the high G actuation timing threshold TH are set. In this region in the low overlap state, the low G actuation timing threshold TL is greater than the high G actuation timing threshold TH, and the low G actuation timing threshold TL and the high G actuation timing threshold TH are set to greater values as the vehicle overlap ratio L increases. Here, in this configuration, a timing TTCa at which the driver performs the collision avoidance operation for an obstacle is calculated according to the vehicle overlap ratio L based on driving behavior data of general drivers. Furthermore, in this configuration, the slope of the low G actuation timing threshold TL may be set in consideration of changes in the timing TTCa with respect to changes in the vehicle overlap ratio L. Furthermore, in this configuration, the slope of the high G actuation timing threshold TH may be set in consideration of changes in the steering limit time to collision TTCc with respect to changes in the vehicle overlap ratio L.

In a region in a moderate overlap state where the vehicle overlap ratio L is between L12 and L11 (L12<L11) (the state where the value of the vehicle overlap ratio L is moderate), the low G actuation timing threshold TL is set to a constant value of the braking limit time to collision TTCy. The high G actuation timing threshold TH is set to a constant value of time y2 which is shorter than the braking limit time to collision TTCy. In a region in the high overlap state where the vehicle overlap ratio L is greater than L11, only the high G actuation timing threshold TH is set. The high G actuation timing threshold TH is set to the braking limit time to collision TTCy, which has a constant value.

The above respective components are conceptual and not limited to the above embodiment. For example, a function of one component may be implemented by being distributed to a plurality of components, and functions of a plurality of components may be implemented by one component.

REFERENCE SIGNS LIST

10 . . . Vehicle control device
11 . . . Object recognition unit
12 . . . Limit value calculation unit
13 . . . Actuation determination unit
14 . . . Control processing unit
21 . . . Radar device
22 . . . Imaging device
31 . . . Warning device
32 . . . Braking device.

The invention claimed is:

1. A vehicle control device comprising:
an object recognition unit that recognizes an object present ahead of an own vehicle;
a collision determination unit that determines a possibility of collision between the object recognized by the object recognition unit and the own vehicle; and
a brake control unit that, in response to the collision determination unit determining that there is the possibility of collision, performs a first brake control for applying a first braking force to the own vehicle and a second brake control for applying a second braking force greater than the first braking force to the own vehicle, as an automatic brake control for applying a braking force to the own vehicle, wherein
the brake control unit sets a first threshold for a timing of starting the first brake control and a second threshold for a timing of starting the second brake control according to a lateral position of the object relative to the own vehicle,
in response to the object being present in a predetermined range of the lateral position that is defined with reference to the own vehicle, the brake control unit does not set the first threshold such that the brake control unit does not perform the first brake control but sets the second threshold to a braking limit time to collision such that the second brake control is performed at a timing in which a time to collision is less than or equal to the second threshold, and the braking limit time to collision is a limit time to collision corresponding to a braking avoidance distance in which braking is actuated to avoid the possibility of collision.

2. The vehicle control device according to claim 1, wherein
the object is an other vehicle, and
the brake control unit changes the timings of starting the first brake control and the second brake control according to a vehicle overlap ratio that is an index indicating a percentage of overlap between the own vehicle and the other vehicle in a vehicle width direction.

3. The vehicle control device according to claim 1, wherein
the brake control unit sets requested deceleration and requested jerk for the first brake control lower than requested deceleration and requested jerk for the second brake control.

4. The vehicle control device according to claim 1, further comprising:
an another vehicle determination unit that, if the object is an other vehicle ahead of the own vehicle, determines whether the other vehicle is present in a same lane as the own vehicle, wherein
in response to the another vehicle determination unit determining that the other vehicle is present in the same lane as the own vehicle, the brake control unit performs the first brake control and the second brake control according to the lateral position, and
in response to the another vehicle determination unit determining that the other vehicle is not present in the same lane as the own vehicle, performing the first brake control is prohibited.

5. The vehicle control device according to claim 1, further comprising:
an operation detection unit that detects a start of a driver's collision avoidance operation for avoiding a collision between the object recognized by the object recognition unit and the own vehicle by comparison between information about steering of the own vehicle and a steering determination value, wherein
in response to the operation detection unit detecting the start of the driver's collision avoidance operation, the brake control unit prevents actuation of the automatic brake control, and
the brake control unit sets the steering determination value of the first and second brake controls, in which the steering determination value of the first brake control is set lower than the steering determination value of the second brake control.

6. A vehicle control method used in a vehicle control device, comprising:
determining a possibility of collision between an object present ahead of an own vehicle and the own vehicle; and
performing, in response to determining that there is the possibility of collision, a first brake control for applying a first braking force to the own vehicle and a second brake control for applying a second braking force greater than the first braking force to the own vehicle, as an automatic brake control for applying a braking force to the own vehicle, wherein
in the performing, timings of starting the first brake control and the second brake control are changed according to a lateral position of the object relative to the own vehicle, wherein a timing of starting the first brake control is set at a first threshold and a timing of starting the second brake control is set at a second threshold, in response to the object being present in a predetermined range of the lateral position that is defined with reference to the own vehicle, the brake control unit does not set the first threshold such that the first brake control is not performed but sets the second threshold to a braking limit time to collision such that the second brake control is performed at a timing in which a time to collision is less than or equal to the second threshold, and the braking limit time to collision is a limit time to collision that corresponds to a braking avoidance distance in which braking is actuated to avoid the possibility of collision.

7. A vehicle control device according to claim 1, wherein in response to the object being present out of the predetermined range of the lateral position that is defined with reference to the own vehicle, the brake control unit sets the first threshold to a steering limit time to collision and sets the second threshold to the braking limit time to collision, the brake control unit performs the first brake control at a timing when the time to collision becomes less than or equal to the first threshold, the brake control unit performs the second brake control at a timing when the time to collision becomes less than or equal to the second threshold, after a start of a brake control through the first brake control, and the steering a limit time to collision is limit time to collision upon an occasion of a steering avoidance limit for which, steering of the own vehicle is operated to avoid the possibility of collision with the object.

8. The vehicle control device according to claim 1, wherein the first and second thresholds are set based on a steering limit time, in which the steering limit time is a time limit in which steering of the own vehicle is operated to avoid the possibility of collision with the object.

9. A vehicle control device comprising:

an object recognition unit that recognizes an object present ahead of an own vehicle;

a collision determination unit that determines a possibility of collision between the object recognized by the object recognition unit and the own vehicle; and a brake control unit that, in response to the collision determination unit determining that there is the possibility of collision, performs a first brake control for applying a first braking force to the own vehicle and a second brake control for applying a second braking force greater than the first braking force to the own vehicle, as an automatic brake control for applying a braking force to the own vehicle, wherein the object is an other vehicle, the brake control unit sets a first threshold for a timing of starting the first brake control and a second threshold for a timing of starting the second brake control according to a lateral position of the object relative to the own vehicle, the brake control unit performs changing of the timings of starting the first brake control and the second brake control according to a vehicle overlap ratio that is an index indicating a percentage of overlap between the own vehicle and the other vehicle in a vehicle width direction, in response to the vehicle overlap ratio being greater than a predetermined value, the brake control unit does not set the first threshold such that the brake control unit does not perform the first brake control but sets the second threshold to a braking limit time to collision such that the second brake control is performed at a timing in which a time to collision is less than or equal to the second threshold, and the braking limit time to collision is a limit time to collision corresponding to a braking avoidance distance in which braking is actuated to avoid the possibility of collision.

10. A vehicle control method used in a vehicle control device, comprising:

determining a possibility of collision between an object present ahead of an own vehicle and the own vehicle; and performing, in response to determining that there is the possibility of collision, a first brake control for applying a first braking force to the own vehicle and a second brake control for applying a second braking force greater than the first braking force to the own vehicle, as an automatic brake control for applying a braking force to the own vehicle, wherein the object is an other vehicle, in the performing, timings of starting the first brake control and the second brake control are changed according to a lateral position of the object relative to the own vehicle, wherein a timing of starting the first brake control is set at a first threshold and a timing of starting the second brake control is set at a second threshold, changing of the timings of starting the first brake control and the second brake control is performed according to a vehicle overlap ratio that is an index indicating a percentage of overlap between the own vehicle and the other vehicle in a vehicle width direction, in response to the vehicle overlap ratio being greater than a predetermined value, the brake control unit does not set the first threshold such that the first brake control is not performed and sets the second threshold to a braking limit time to collision such that the second brake control is performed at a timing in which a time to collision is less than or equal to the second threshold, and the braking limit time to collision is a limit time to collision corresponding to a braking avoidance distance in which braking is actuated to avoid the possibility of collision.

* * * * *